(12) United States Patent
Soragavi et al.

(10) Patent No.: US 12,096,511 B2
(45) Date of Patent: Sep. 17, 2024

(54) SERVICE DISCOVERY FOR WIRED HOSTS

(71) Applicant: Hewlett Packard Enterprise Development LP, Houston, TX (US)

(72) Inventors: Nikhil Shrishail Soragavi, Karnataka (IN); Vinay Gopi, Karnataka (IN); Sanidhya Balehonnur Harish, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 355 days.

(21) Appl. No.: 17/515,597

(22) Filed: Nov. 1, 2021

(65) Prior Publication Data
US 2023/0136345 A1  May 4, 2023

(51) Int. Cl.
| H04W 8/00 | (2009.01) |
|---|---|
| H04L 41/12 | (2022.01) |
| H04W 48/10 | (2009.01) |
| H04W 88/08 | (2009.01) |

(52) U.S. Cl.
CPC ............ *H04W 8/005* (2013.01); *H04L 41/12* (2013.01); *H04W 48/10* (2013.01); *H04W 88/08* (2013.01)

(58) Field of Classification Search
None
See application file for complete search history.

(56) References Cited

U.S. PATENT DOCUMENTS

| 9,231,862 | B2 | 1/2016 | Agarwal et al. | |
|---|---|---|---|---|
| 9,350,815 | B2 | 5/2016 | Agarwal et al. | |
| 10,425,287 | B2 | 9/2019 | Shetty et al. | |
| 10,805,173 | B1 | 10/2020 | Janakiraman | |
| 2009/0077268 | A1* | 3/2009 | Craddock | H04L 49/9078 709/250 |
| 2014/0136660 | A1* | 5/2014 | Ghai | H04L 12/2836 709/219 |
| 2016/0062719 | A1 | 3/2016 | Romano et al. | |
| 2018/0063875 | A1* | 3/2018 | Toebes | H04W 76/10 |
| 2018/0241631 | A1 | 8/2018 | Shetty et al. | |
| 2018/0255020 | A1* | 9/2018 | Shetty | H04L 41/042 |
| 2020/0092139 | A1 | 3/2020 | Nandy et al. | |
| 2020/0137024 | A1 | 4/2020 | Janakiraman | |
| 2020/0137093 | A1 | 4/2020 | Janakiraman et al. | |
| 2020/0137094 | A1 | 4/2020 | Janakiraman | |
| 2020/0162853 | A1* | 5/2020 | Gunasekara | H04W 4/90 |
| 2021/0289338 | A1* | 9/2021 | Hu | H04W 76/10 |

FOREIGN PATENT DOCUMENTS

WO  WO-2005039206 A1 *  4/2005  ............ H04L 12/18

* cited by examiner

*Primary Examiner* — Chi H Pham
*Assistant Examiner* — Raul Rivas
(74) *Attorney, Agent, or Firm* — Hewlett Packard Enterprise Patent Department

(57) ABSTRACT

Examples of techniques for service discovery of wired host devices are described. In an example, a controller may receive a service advertisement message comprising information of a service hosted by a wired host device in a network. Based on a header information of the service advertisement message the controller determines that the service advertisement message is from a switch. The controller maps the wired host device to a set of Wireless Access Points (WAPs) connected to the switch. Further, the controller may send identification information of the wired host device to a client device connected to one of the set of WAPs, in response to receiving a query for the service from the client device.

20 Claims, 6 Drawing Sheets

SERVICE DISCOVERY FOR WIRED HOSTS

BACKGROUND

A computer network includes a variety of network devices, such as access points, controllers, gateways, switches, etc., which perform different networking operations, such as network access, authentication, and routing network traffic to provide connectivity. A Wireless Local Area Network (WLAN) may include a plurality of Wireless Access Points (WAPs), as elements of the WLAN. These WAPs may be deployed in a network.

Host devices, such as printers, smart TVs, smart boards, etc., may connect to client devices, such as smartphones, laptops, etc. and provide a range of multimedia services in a network, such as a campus Wi-Fi network or office Wi-Fi network. The host devices may host a range of multimedia services, such as printing, multimedia content streaming, interactive broadcasting, etc. The host devices may be wired which may connect to switches spread across different locations or sites in the network. A wireless client device, such as a laptop or smartphone, may roam across the network and may connect to different WAPs servicing different parts of the network to access services hosted by the host devices.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
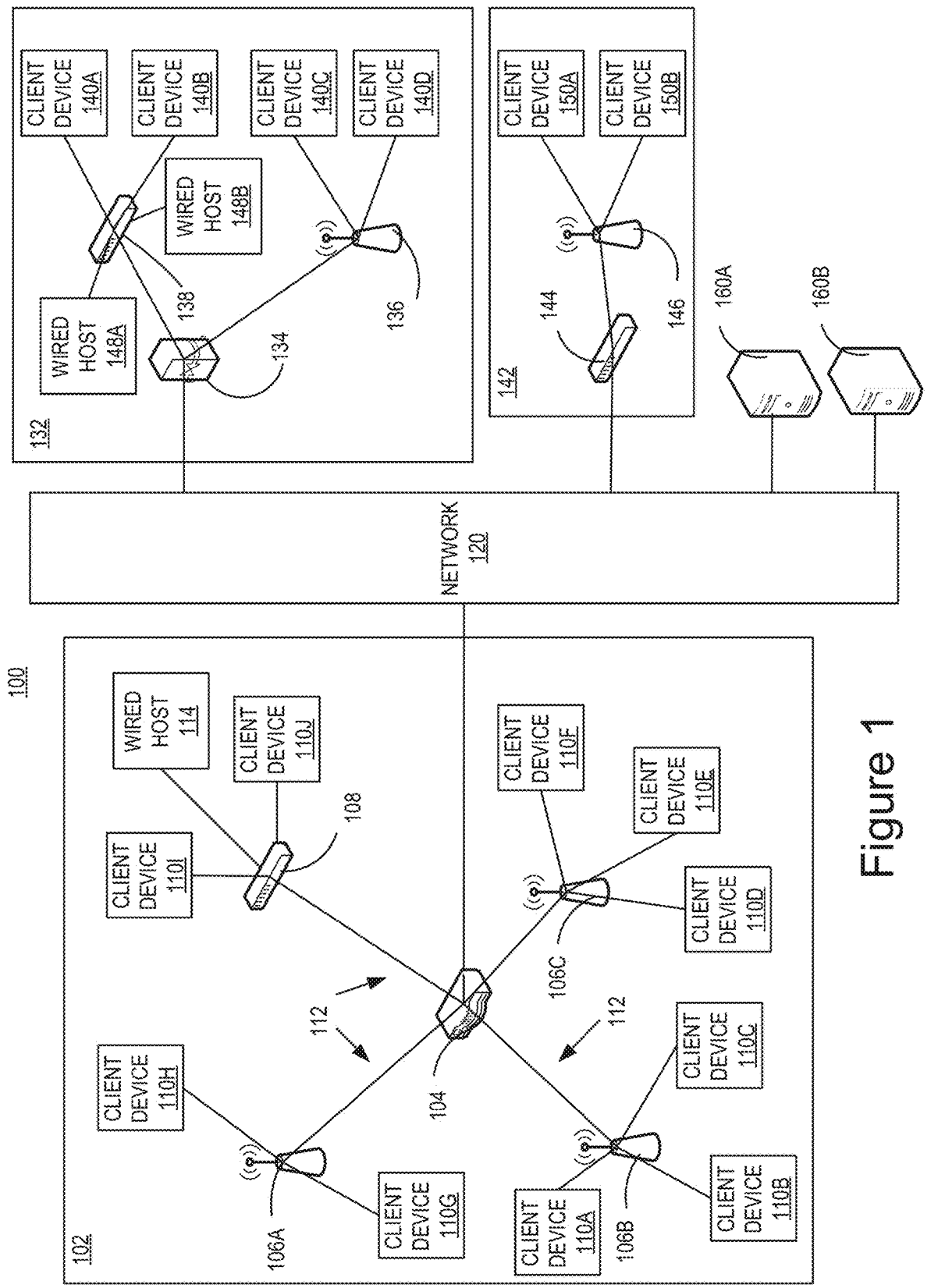
FIG. 1 illustrates an example of a network configuration in which embodiments of the invention may be implemented for an organization, such as a business, educational institution, governmental entity, healthcare facility or other organization.

The figures are not exhaustive and do not limit the present disclosure to the precise form disclosed.

DETAILED DESCRIPTION

Generally, the host devices may advertise their hosted services by sending multicast packets to client devices in a network. In some examples, Zero-configuration networking (zeroconf) technologies allow service discovery, address assignment, and name resolution for the client devices connected to a wireless network without separate manual configuration. With zeroconf technologies, client devices connected to a wireless network may automatically discover services hosted by host devices connected to the network. Zeroconf technologies generally use multicast DNS (mDNS) to locate host devices and the services that those devices offer. The host devices using mDNS may advertise the availability of services to the client devices.

When a client device using mDNS needs to resolve a hostname, it may send an Internet Protocol (IP) multicast query message asking the host device having that hostname to identify itself. The host device in response multicasts a message that includes its IP address to all client devices in the subnet. All client devices in that subnet can then use that information to update their multicast mDNS caches. Because multicast traffic is usually not routed across subnets, service discovery using mDNS requires host devices and the client devices accessing the host devices to be on the same subnet which is generally the case for small networks, such as home networks.

However, with large enterprise networks, such as campus networks in universities, office networks, etc., the client devices may connect to the network across different subnets. As a result, client devices on a specific Virtual Local Area Network (VLAN) may not be able to discover services offered by host devices in another VLAN. Also, in some examples, with large number of client devices and host devices in an enterprise network, multicast traffic in the network may increase due to mDNS service discovery by multiple client devices. This may consequently increase the traffic load on the network and adversely affect network performance. In some other examples, broadcast and multicast traffic may be filtered out from a wireless LAN (WLAN) network to which the client devices are connecting in order to preserve airtime and battery life of the WAPs in the WLAN network. This may inhibit mDNS-based service discovery in large enterprise networks and WLANs, as it relies on multicast traffic.

In a WLAN deployment, there may be multiple WAPs managed by a controller. The controller allows configuration, maintenance, and management of the WAPs connected to it. In some examples, the controller may include capabilities to function as a unicast querier and responder on behalf of mDNS capable devices and thereby may reduce/eliminate the propagation of multicast mDNS traffic in the WLAN. Each WAP to which a wireless host device is connected may send information of services advertised by the wireless host device to an external server, such as a management server. The management server may store information of services advertised by the wireless host devices in the network and may share the information with all WAPs. In an example, association information between a WAP and a wireless host device connected to the WAP is stored in the management server. In an example, the association information may include a Media Access control (MAC) address of the wireless host device mapped to a MAC address/service set identifier (SSID) of the WAR. The WAP may store information of services hosted by the wireless host devices connected to it in a multicast mDNS cache. Client devices accessing the services may register themselves in the management server and may be associated with an access privilege. A registered client device connecting to a WAP may send a multicast mDNS query for a service. In response to receiving the query, the WAP may check its multicast mDNS cache for state information of the service and query the management server to map the client device's access privileges to the service. If the client device has the privilege to access the service, the WAP may respond to the mDNS query with the state information of the service.

In some examples, the controller and/or the WAPs may be aware of a location of wireless host devices, such as wireless printers, wireless smart boards, etc., based on the association information. During service discovery by a client device connected to a WAR, the association information may be used by the controller or the WAP to present wireless host devices, in proximity to the client device, providing the queried service. For example, depending on proximity, a laptop may be presented with the closest printer instead of all the printers in the building. In another example, a user in a conference room may intend to use a multimedia streaming service to project a laptop screen on a smart TV. When the laptop queries the network for a list of available smart TVs, the location-aware WAP/Controller may provide a list of smart TVs close to the laptop, such as smart TVs connecting to the same WAP or neighbor W % APs as that of the laptop.

Because the association information of the wireless host device and the WAP is stored in the WAP/controller, the wireless host device connected to a WAP may be discoverable by the client devices connecting to the same WAP or neighboring WAPs in its proximity. Thus, the wireless host device is discoverable by client devices in its proximity which allows location-aware discovery of wireless host devices. Location-aware discovery of host devices becomes particularly relevant in enterprise deployments, such as campus networks or office networks. For example, in a campus network of a university, there could be a multitude of buildings and classrooms. For efficient service discovery, laptop1 connecting to WAP1 in classroom1 should be able to discover smart boards inside or in the proximity of classroom1 for streaming of multimedia content.

For wireless host devices, since the association information is present in the WAP/Controller, the WAP is aware of the location of the wireless host device and therefore client devices connecting to the WAP may discover wireless host devices in its vicinity. However, since wired host devices do not associate with the WAP directly, the WAPs in the network may not be aware of the location of the wired host devices. Generally, in some example deployments, the wired host devices are connected to a switch which may be connected to a WAP. In such deployments, the location of the wired host device may be represented by the WAP to which the switch is connected. A network administrator may manually create the association information, i.e., the mapping between the MAC address of the wired host device and the WAP and store the association information in the management server. Manually creating, maintaining, and updating the association information may be tedious, particularly for an enterprise deployment with large number of wired host devices, switches, and WAPs. Also, such a manually maintained association information may be error-prone which may inhibit service discovery for client devices attempting to access services hosted by the wired host devices. Further, without the association information, the client devices may not be able to selectively discover wired host devices in their proximity. For example, a client device connecting to a WAP in lab1 of a campus network of a university may be presented with a list of all available wired host devices hosting the queried service in the campus network. Some of the wired host devices in the list may be located in different locations, such as different labs or buildings or sites. If the user accidentally selects a wired host device at a different site than that of the client device, the client device may connect to the wired host device in a remote site which is undesirable. For example, a smartphone in a physics lab attempting to use a multimedia streaming service hosted by a wired smartboard in the physics lab may accidentally connect to another smartboard in a chemistry lab which is undesirable.

Embodiments of the present invention include systems and methods which allow selective discovery of a wired host device in proximity to a client device attempting to access a service hosted by the wired host device. In an example, the selective discovery is based on a mapping between the wired host device and a set of WAPs to which the client device connects. The disclosed techniques include receiving, by a controller, a service advertisement message comprising information of a service hosted by a wired host device in a network. The controller may determine that the service advertisement message is from a switch based on a header information of the service advertisement message. The controller may map the wired host device to a set of Wireless Access Points (WAPs) connected to the switch. Further, the controller may send identification information of the wired host device to a client device connected to one of the set of WAPs, in response to receiving a query for the service from the client device.

Since the client device is provided with the identification information of the wired host device(s) mapped to the set of WAPs, only the wired host device(s) which are in the vicinity of the client device are discoverable by the client device. Thus, undesirable discovery of wired host devices in remote sites may be reduced or eliminated, thereby allowing efficient service discovery. Further, since the mapping between the wired host device and the set of WAPs is dynamically based on analysis of the service advertisement message, tedious and error-prone manual location tagging of wired host devices may be eliminated. Also, a user of the client device may not need to scroll through a large list of available wired devices, since a selective list of wired host devices in the vicinity are provided to the client device. Further, network traffic may also be reduced as identification information of all the wired host devices providing the queried service is not multicast to client devices, which may have otherwise caused a large traffic overhead in the network and reduce network throughput.

The following detailed description refers to the accompanying drawings. Wherever possible, the same reference numbers are used in the drawings and the following description to refer to the same or similar parts. While several embodiments of the present invention are described herein, modifications, adaptations, and other implementations of those embodiments are possible. Accordingly, the following detailed description does not limit the scope of the present invention. Instead, the proper scope of the present invention is defined by the appended claims.

Before describing embodiments of the systems and methods of the present invention in detail, it is useful to describe an example network installation in which these systems and methods might be implemented in various applications. FIG. 1 illustrates one example of a network configuration 100 in which an embodiment of the present invention may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, campus network, home network or other network installation. The primary site 102 network may be a private network, such as a network that may include security and access controls to restrict access to authorized users of the private network. Authorized users may include, for example, employees of a company at primary site 102, residents of a house, students of an university, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point. In some examples, the controller 104 may provide functionality of a unicast querier and responder on behalf of mDNS capable devices and may eliminate the propagation of multicast mDNS traffic in a WLAN.

The controller 104 may be in communication with one or more switches 108 and/or wireless Access Points (WAPs) 106a-c. Switches 108 and WAPs 106a-c provide network connectivity to various client devices 110a-j. Using a connection to a switch 108 or WAP 106a-c, a client device 110a-j may access network resources, including other devices on the (primary site 102) network and the network 120. Examples of client devices may include: desktop computers, laptop computers, tablet computers, e-readers, netbook computers, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Further, a wired host device 114 may connect to the switch 108 and through the switch 108, may be accessible by other devices within the network configuration 100. A wired host device may provide services, such as printing, multimedia content streaming, etc. and may advertise such services by sending mDNS messages to the switch 108. Examples of the wired host device 114-1 may include a printer, a smartboard, a smart music player, etc. The wired host device 114 may be accessed by client devices 110a-j.

WAPs 106a-c are included as another example of a point of access to the network established in primary site 102 for wireless client devices 110a-h. The WAPs 106a-c may control network access of the client devices 110a-h and may authenticate the client devices 110a-h for connecting to the WAPs and through the WAPs, to other devices within the network configuration 100. Each of WAPs 106a-c may be a combination of hardware, software, and/or firmware that is configured to provide wireless network connectivity to wireless client devices 110a-h. In the illustrated example, WAPs 106a-c can be managed and configured by the controller 104. WAPs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, a conference room, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or WAP 136 in communication with the gateway device 134 over either wired or wireless connections. The switch 138 and WAP 136 provide connectivity to the network for various client devices 140a-d.

Further, the remote site 132 may include wired host devices 148A-B connected to the switch 138. The wired host devices 148A-B may be accessed by client devices 140A-D of the remote site 132 or client devices 110A-J of the primary site 102. The wired devices 148A-B may host multiple services and may advertise such services by sending mDNS messages to the switch 138. In various embodiments, the remote site 132 may be in direct communication with primary site 102, such that client devices 140A-D at the remote site 132 access the network resources at the primary site 102 as if these clients devices 140A-D were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150A-B were located at the primary site 102. The remote site 142 may be managed by the controller 104 at the primary site 102 to make this transparency possible. Once connected to the primary site 102, the remote site 142 may function as a part of a private network provided by the primary site 102. Further, the client devices 110A-J, 140A-D, 150A-B may request and access the services provided by the wired host devices 114 and 148A-B.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160A-B include, for example, web servers, streaming radio and video providers, and cable and satellite television providers. The client devices 110A-J, 140A-D, 150A-B may request and access the multimedia content provided by the content servers 160A-B.

In the system 100 of FIG. 1, a client device, for example, the client device 110A may send a query for a service hosted by the wired host device 114 to the controller 104. In an example, the query may be an mDNS query. Consider that the queried service is hosted by all the wired host devices 114 of the primary site 102 and 148A-B of the remote site 132. As discussed in more detail below, embodiments of the present invention include methods for mapping the wired host device 114 to a set of Wireless Access Points (WAPs), e.g., 106A-C in the proximity, i.e., in the primary site 102, where the client device 110A is connected to one of the set of WAPs. Thus, in response to receiving a query for the service from the client device 110A, identification information of the wired host device 114 is selectively sent to the querying client device instead of sharing identification information of the wired host devices 143A-B in the remote site 132. This allows the client devices to discover wired host devices only in the proximity rather than discovering an entire list of wired host devices in the network, consequently, allowing location-aware service discovery for the client device. Also, the presently disclosed techniques are not based on manual tagging of wired host devices to a location. Rather, in the present techniques, the wired host devices are dynamically mapped to WAPs of a particular location, for example, the mapping between the wired host device 114 and the WAPs 106A-C of the primary site 102. Details of operations performed to establish the mapping between a wired host device (e.g., the wired host device 114) and a set of WAPs (e.g., the WAPs 106A-C) are described in conjunction with methods presented in FIGS. 2-5.

Figure 2:
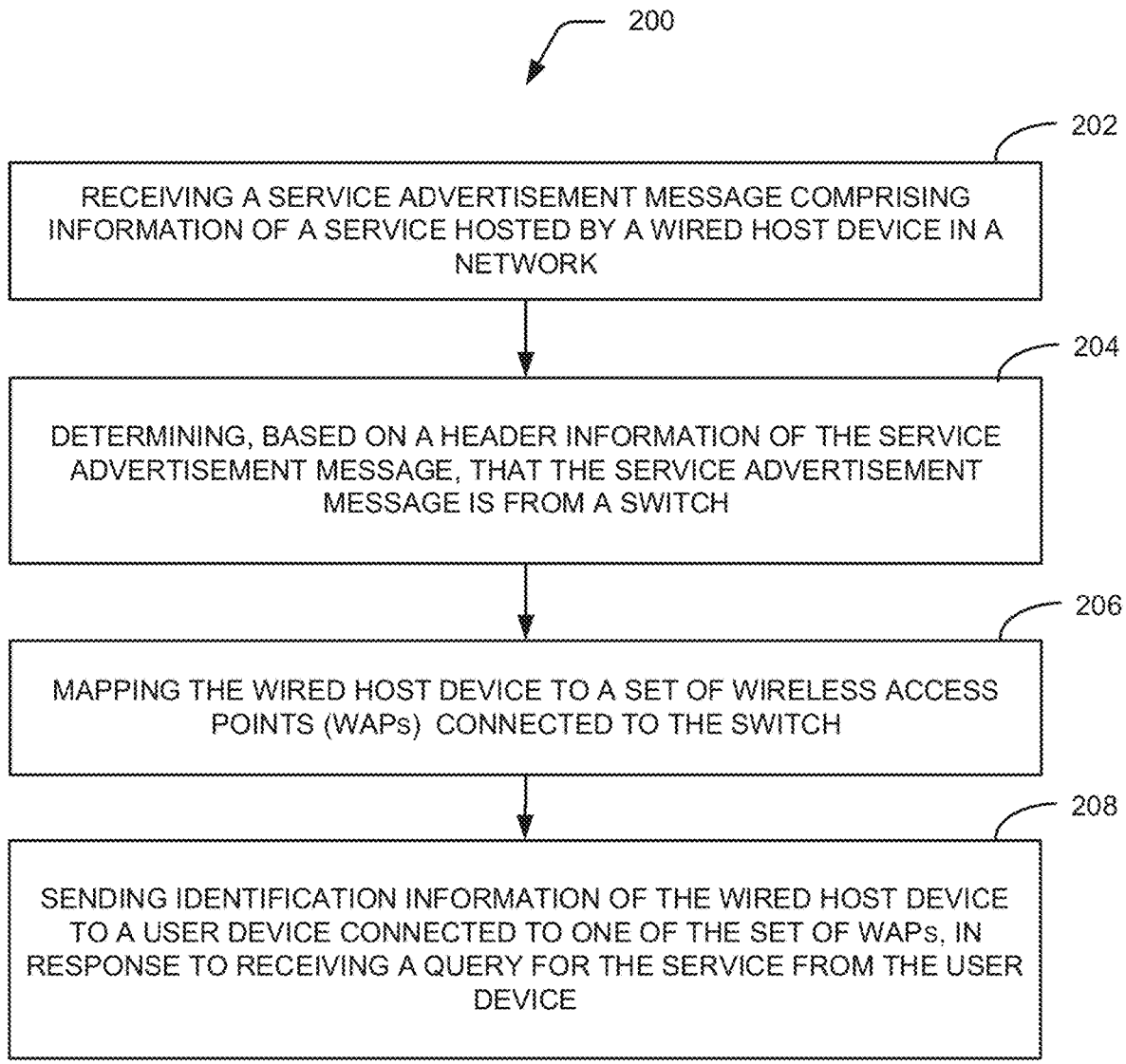
FIG. 2 is an example method for service discovery of wired host devices in accordance with an embodiment of the invention.

FIG. 2 illustrates an example method 200 for service discovery of wired hosts in accordance with an embodiment of the present invention. The method 200 may be executed by a network device, such as a controller 104 of FIG. 1. The method 200 can be implemented by processing resource(s) or computing device(s) through any suitable hardware, a non-transitory machine readable medium, or combination thereof. In an example, the method 200 may be performed by computer-readable instructions, which include instructions stored on a medium and executable by a processing resource, such as a hardware processor, of a computing device/component. It may be understood that processes involved in the method 200 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 2, at block 202, the controller may receive a service advertisement message comprising information of a service hosted by a wired host device in a network. In an example, the wired host device may be connected to a switch. The wired host device may send a multicast transmission of the service advertisement message to the switch. Thus, the service discovery message may be forwarded by the switch to each of its ports from which the controller managing the switch may receive the service advertisement message. The service advertisement message may include a name of the service, capability information, state information, etc. In an example, the service advertisement message is an encapsulated mDNS packet received from the switch.

At block 204, the controller may determine, based on a header information of the service advertisement message, that the service advertisement message is from the switch. In one example, the service advertisement message may include a first multicast packet encapsulated within a second multicast packet. The controller may analyse the header information of the second multicast packet to identify a source MAC address of the service advertisement message, where the source MAC address may represent a MAC address of the switch. Thus, based on the source MAC address in the header information, the controller may determine that the service advertisement message is from the switch.

At block 206, the Controller may map the wired host device to a set of Wireless Access Points (WAPs) connected to the switch. In an example, the controller may analyze the first multicast packet to identify the wired host device from which the service advertisement message originated. In an example, on identifying the wired host device, the Controller may associate the wired host device with the switch, i.e., with the location in which the switch is installed. Since, the controller is aware of a set of WAPs connected to the switch, the controller may map the wired host device to the set of WAPs. In an example, the Controller may store the mapping between the wired host device and the set of WAPs in a management server.

At block 208, the Controller may send identification information of the wired host device to a client device connected to one of the set of WAPs, in response to receiving a query for the service from the client device. The identification information of the wired host device may include a Universally Unique Identifier (UUID) associated with the wired host device, a device name, device type, capability, etc. Thus, the wired host device in the vicinity of the client device becomes discoverable by the client device querying for the service hosted by the wired host device.

Figure 3:
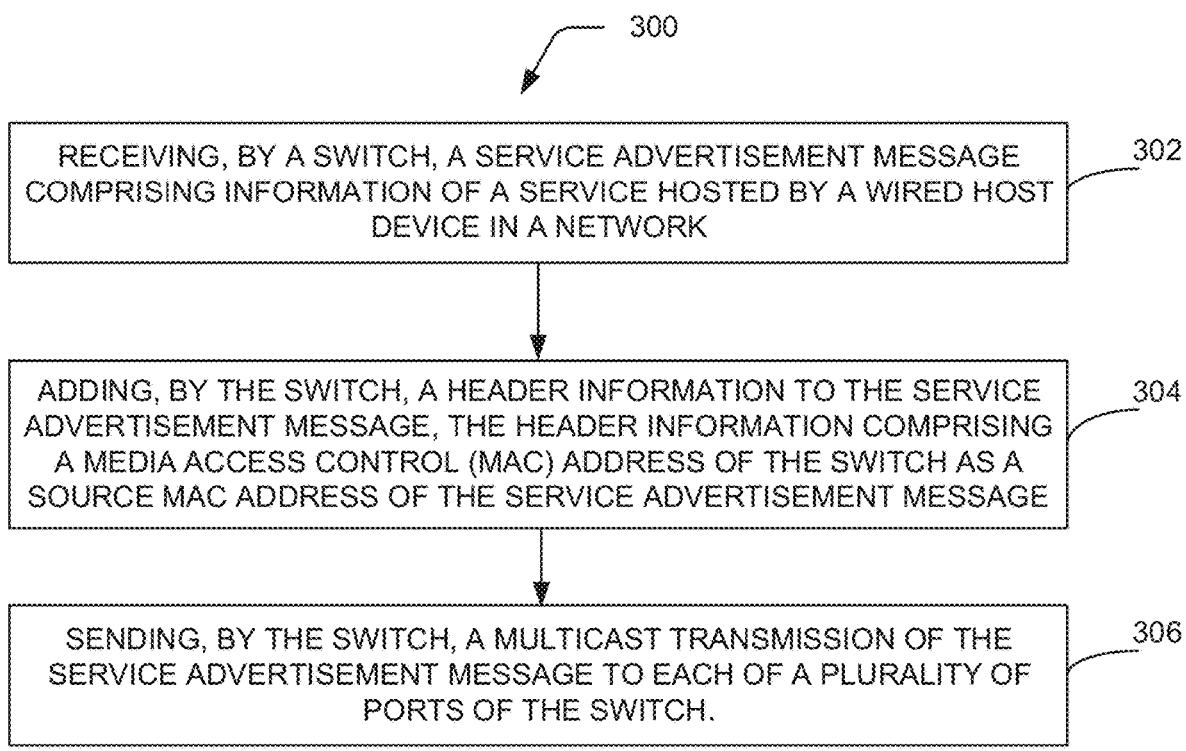
FIG. 3 is another example method for service discovery of wired host devices in accordance with an embodiment of the invention.

FIG. 3 illustrates an example method 300 for service discovery of wired hosts in accordance with an embodiment of the present invention. The method 300 may be executed by a switch, such as the switch 108 of FIG. 1. In an example, the switch may be connected to a controller, such as the controller 104, via a wired connection. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as a hardware processor, of a computing device/component. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a switch may receive a service advertisement message comprising information of a service hosted by a wired host device in a network. In an example, the wired host device may be connected to an access port of the switch. In an example, the service advertisement message may be a multicast User Datagram Protocol (UDP) packet originating from the wired host device. The service advertisement message may include information of one or more services hosted by the wired host device, such as service name, service type, etc.

At block 304, the switch may add a header information to the service advertisement message. The header information includes a MAC address of the switch as a source MAC address of the service advertisement message. In an example, adding the header information may include encapsulating a first multicast UDP packet of the service advertisement message originating from the wired host device by a second multicast UDP packet. The MAC address of the switch may be included in the "source MAC" field of the header of the second multicast UDP packet.

At block 306, the switch may send a multicast transmission of the service advertisement message to each of a plurality of ports of the switch. Since, the service advertisement message received from the wired host device is a multicast packet, it is forwarded by the fabric of the switch to each of its ports. In an example, a port of the switch may be connected to a controller. Thus, the encapsulated service advertisement message is transmitted to the controller.

Figure 4:
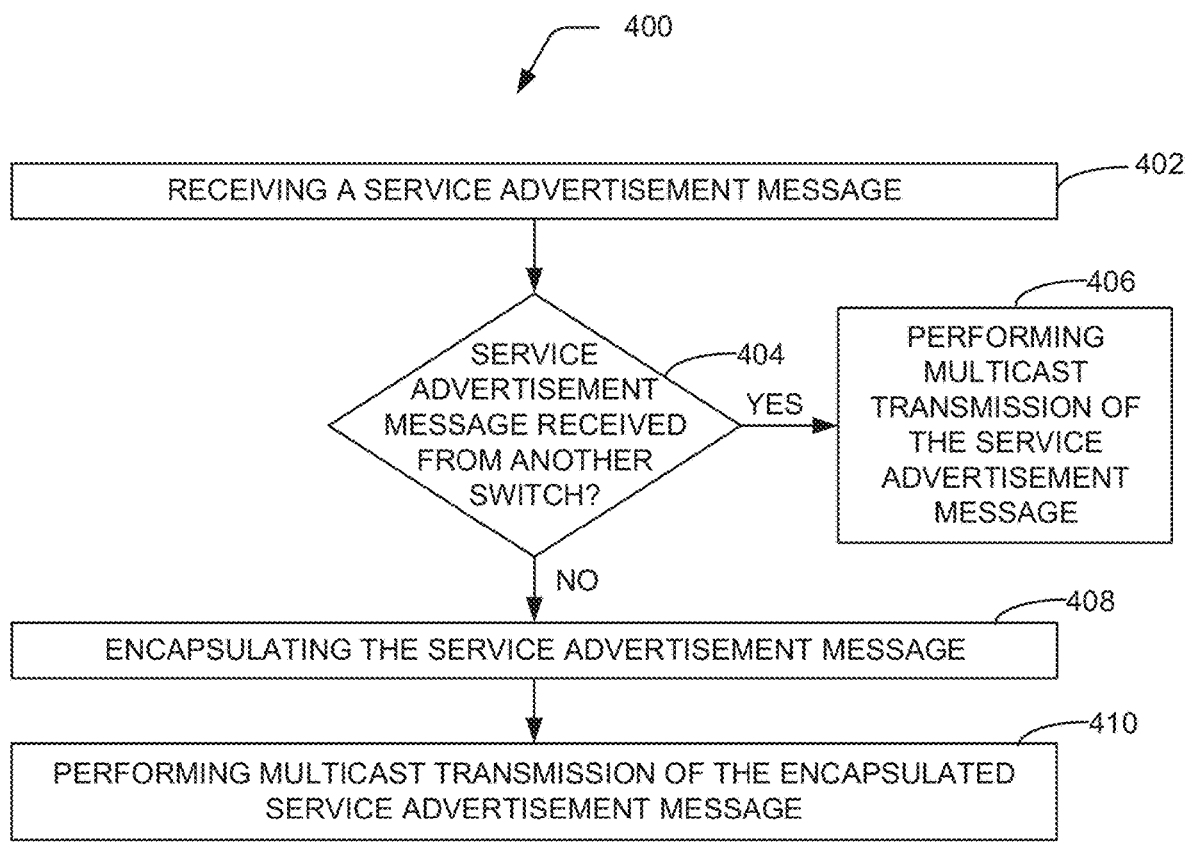
FIG. 4 is another example method for service discovery of wired host devices in accordance with an embodiment of the invention.

FIG. 4 illustrates an example method 400 for service discovery of wired hosts in accordance with an embodiment of the present invention. The method 400 may be executed by a switch, such as the switches 108 or 138 of FIG. 1. The method 400 can be implemented by processing resource(s) or computing device(s) through any suitable hardware, a non-transitory machine readable medium, or combination thereof. In an example, the method 400 may be performed by computer-readable instructions, which include instructions stored on a medium and executable by a processing resource, such as a hardware processor, of a computing device/component. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Each of the switches in a network may maintain its neighbor information, i.e., information of neighbor switches, WAPs, etc., in the network. In an example, the neighbor information may be in the form of Link Layer Discovery Protocol (LLDP) tables. The neighbor information may include a MAC address of a neighbor device, an interface identifier, capability, and a system name. The neighbor information may be forwarded by the switches to a management server connected to the network over the internet or an IP network. Thus, the management server may store neighbor information for each of the switches in the network. In some examples, a switch may periodically obtain the neighbor information from the management server in order to synchronize the neighbor information. Based on the neighbor information, the switch may create a list of neighbor switches in the network. In some examples, capability and system name of a network device included in the neighbor information may indicate whether a particular device is a switch or not.

Referring to FIG. 4, at block 402, the switch may receive a service advertisement message from a wired host device connected to the switch. The wired host device connected to the switch may advertise its hosted services to the switch using multicast UDP packets. In an example, the service advertisement message is referred to as a first multicast packet.

In response to receiving the service advertisement message, at block 404, the switch may check whether the service advertisement message is received from another switch in the network. In an example, the switch may identify the source MAC address mentioned in an mDNS header of the service advertisement message and compare the source MAC address with MAC addresses of the list of neighbor switches. If the source MAC address matches with a MAC address of any of the list of neighbor switches, the switch may determine that the service advertisement message is received from another switch.

In response to determining that the service advertisement message is received from another switch ('Yes' branch from block 404), the switch may forward the service advertisement message to each of its ports. Thus, the service advertisement message is directly forwarded for multicast transmission at block 406. However, in response to determining that the service advertisement message is not received from another switch ('NO' branch from block 404), at block 408, the switch may perform an encapsulation of the service advertisement message. Encapsulation of the service advertisement message may include adding a second multicast packet over a first multicast packet of the service advertisement message. The second multicast packet may include a header with a source MAC address identical to the MAC address of the switch.

In an example deployment, a port of the switch may be connected to a trunk port of the controller. A trunk port is a type of port that allows data to flow across a network node for multiple VLANs allowed on the trunk port. The trunk port of the controller allows data from devices in different VLANs that are allowed on the trunk port. In an example, the wired host device may be configured in a VLAN that is allowed on the trunk port. Thus, traffic forwarded to the port of the switch connected to the trunk port may reach the trunk port of the Controller.

In another example, the switch may be connected to the trunk port of the controller, however the VLAN in which the wired host device is configured may not be allowed (or "trunked") on the trunk port of the controller. In such a scenario, the switch may elect a WAP from a set of WAPs connected to the switch as a leader WAP. The switch may identify the set of WAPs connected to it using the neighbor information. The leader WAP may be selected using a MAC address-based hashing technique. The leader WAR may form a multicast aggregation tunnel with the controller using a tunnelling protocol, such as Generic Routing Encapsulation (GRE), OpenVPN, etc. The multicast aggregation tunnel allows transfer of mDNS/Simple Service Discovery Protocol (SSDP) traffic from a subnet in which the wired host device is configured to the controller. This is known as multicast aggregation. Multicast aggregation allows discovery of wired host devices which do not have layer 2 connectivity with the controller or which do not trunk in the controller. The leader WAP, which is in the same VLAN as the wired host device which does not trunk in the controller, receives and forwards the mDNS/SSDP packets from the wired host device to the controller and from the controller to the wired host device. The leader WAP forms the multicast aggregation tunnel with the controller and aggregates all mDNS/SSDP traffic to and from the controller.

On encapsulation of the packet, at block 410, the switch may perform multicast transmission of the encapsulated service advertisement message. Thus, the encapsulated service advertisement message is forwarded to each of the ports of the switch. If the trunk port of the controller to which the switch is connected is allowed to receive traffic from the VLAN in which the wired host device is configured, then the controller may receive the encapsulated service advertisement message directly from the switch.

However, if the VLAN in which the wired host device is configured is not trunked to the trunk port of the controller, then the leader WAP connected to the switch may receive the encapsulated service advertisement message after the multicast transmission from the port of the switch. On receipt of the encapsulated service advertisement message, the leader AP may forward the service advertisement message to the controller over the multicast aggregation tunnel. Thus, the encapsulated service advertisement message is transmitted to the controller.

Figure 5:
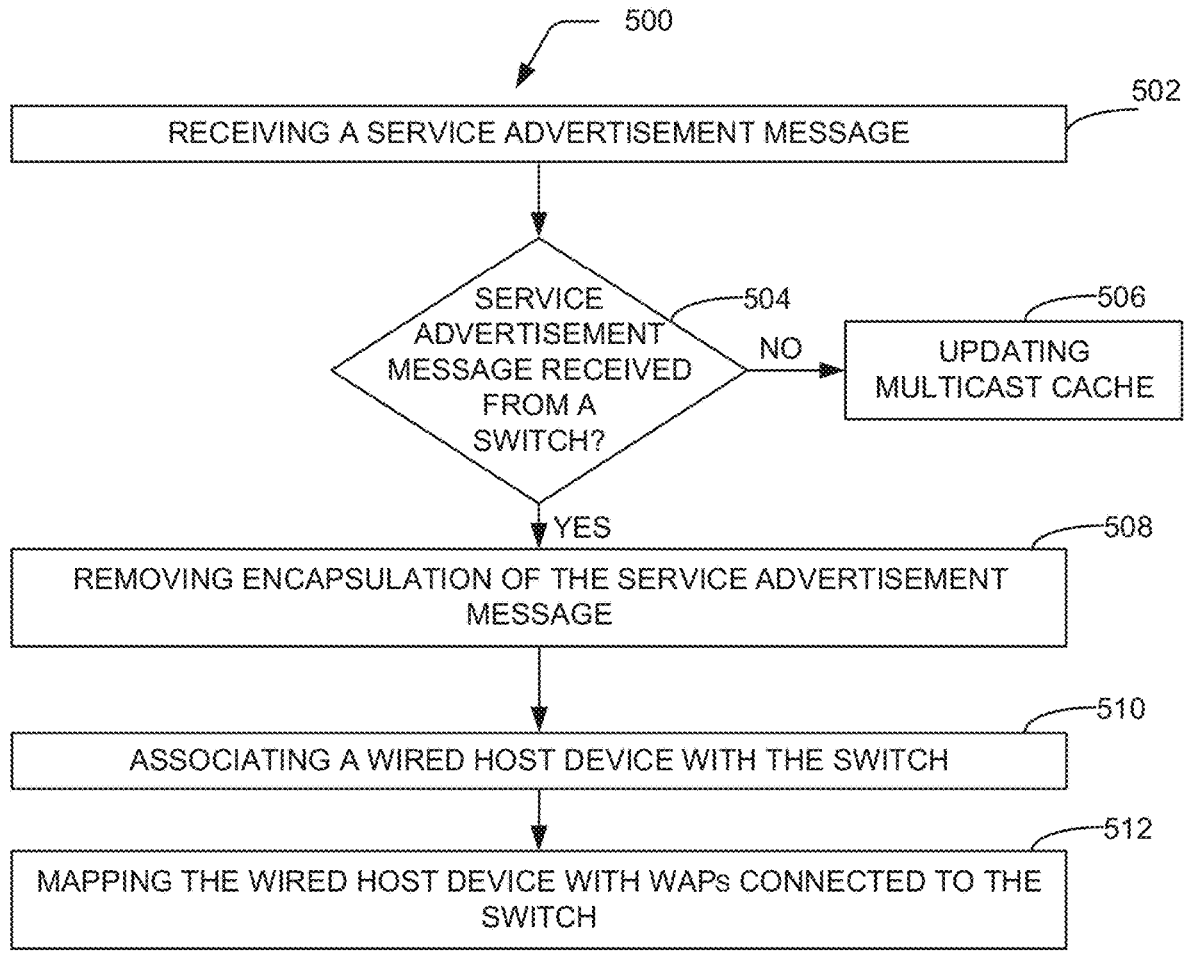
FIG. 5 is yet another example method for service discovery of wired host devices in accordance with an embodiment of the invention.

FIG. 5 illustrates an example method 500 for service discovery of wired hosts in accordance with an embodiment. The method 500 may be executed by a controller, such as the controller 104 of FIG. 1. The method 500 can be implemented by processing resource(s) or computing device(s) through any suitable hardware, a non-transitory machine readable medium, or combination thereof. Further, although the method 500 is described in context of the aforementioned controller, other suitable systems may be used for execution of the method 500. It may be understood that processes involved in the method 500 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 5, at block 502, the controller may receive a service advertisement message. In an example, the service advertisement message is an encapsulated mDNS packet received from a switch connected to a wired network device. The wired network device may advertise its hosted services through the service advertisement message. In an example, the controller may receive the service advertisement message over a trunk port connected to the switch, when the VLAN in which the wired host device is configured is allowed on the trunk port. If the VLAN of the wired host device is not trunked to the controller, the controller may receive the service advertisement message via a multicast aggregation tunnel from a WAP configured in the same VLAN as that of the wired host device.

In response to receiving the service advertisement message, at block 504, the controller may check whether the service advertisement message is from a switch. In an example, the controller may periodically synchronize the neighbor information from the management server. In some examples, the controller may periodically obtain neighbor information for each of the list of switches from the management server and determine a set of WAPs connected to the switch based on neighbor information of the switch. In an example, the neighbor information may be in the form of LLDP tables. The neighbor information may include a MAC address of a neighbor device, an interface identifier, a capability, and a system name. Based on the capability in the neighbor information, the controller may identify the list of switches in the network. At block 504, the controller may check a source MAC address mentioned in the header of an mDNS packet of the service advertisement message. If the source MAC address matches with the MAC address of one of the switches in the list, the controller determines that the service advertisement message is from the switch.

In response to determining that the service advertisement message is not from a switch ('No' branch from block 504), at block 506, the controller may update its multicast mDNS cache. The controller may further use this multicast mDNS cache to share information of the wired host device in response to receiving an mDNS query for a service hosted by the wired host device. The controller may use the multicast mDNS cache to function as a unicast querier and responder on behalf of mDNS capable host devices and eliminate the propagation of multicast mDNS traffic in the WLAN.

In response to determining that the service advertisement message is from a switch (Yes' branch from block 504), the controller may store the MAC address of the switch mentioned in the source MAC and remove encapsulation of the service advertisement message, at block 508. In an example, removing the encapsulation may include deleting the header information from an outer multicast mDNS packet added by the switch to obtain an inner multicast mDNS packet generated by the wired host device. The inner mDNS packet has a MAC address of the wired host device as the source MAC. The inner mDNS packet also referred to as a first multicast packet is an mDNS service advertisement generated by the wired host device and the outer mDNS packet also referred to as a second multicast packet is an mDNS packet encapsulating the first mDNS packet.

At block 510, the wired host device is associated with the switch. Associating the wired host device may include mapping a MAC address of the wired host device with a MAC address of the switch. As a consequence, the wired host device gets mapped to a location of the switch. For example, if the switch is in floor1 of building1, the wired host device gets tagged to floor1 of building1 as a result of the association.

At block 512, the controller may map the wired host device to the set of WAPs connected to the switch. The set of WAPs may be identified based on the neighbor information of the switch. Mapping the wired host device to the set of WAPs includes registering the wired host device against each of the set of WAPs such that the wired host device is discoverable by client devices connecting to one of the set of APs. Thus, when an mDNS query for a service is received from a client device connected to one of the set of WAPs, the controller may respond with identification information of the wired host device mapped to the WAP. Thus, the wired host device connected to the switch may be discoverable by client devices connecting to one of the set of WAPs of the switch. This allows location-aware service discovery for the client devices connected to the set of WAPs.

Figure 6:
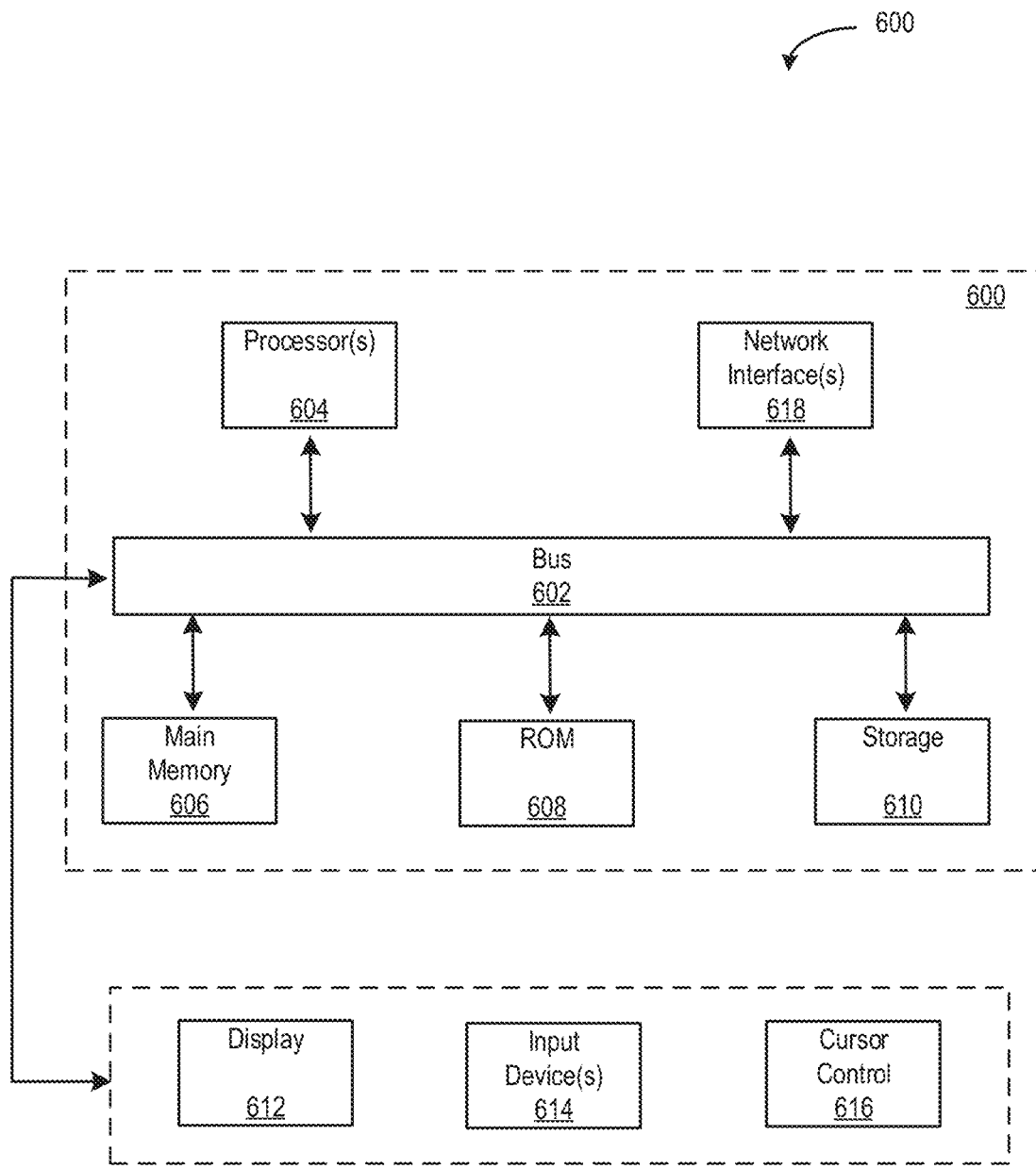
FIG. 6 depicts a block diagram of an example computer system in which the embodiments described herein may be implemented.

FIG. 6 depicts a block diagram of an example computer system 600 in which the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USE thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present invention have been described in language specific to structural features and/or methods, it is to be noted that the present invention is not necessarily limited to the specific features or methods described. Rather, the specific features and methods are disclosed and explained in the context of a few implementations for the present invention.

We claim:

1. A method comprising:
   receiving, by a controller, a service advertisement message comprising information of a service hosted by a wired host device in a network;
   determining, by the controller and based on a header information of the service advertisement message, that the service advertisement message is from a switch;
   mapping, by the controller, the wired host device to a set of Wireless Access Points (WAPs) connected to the switch; and
   sending, by the controller, identification information of the wired host device to a client device connected to one of the set of WAPs, in response to receiving a query for the service from the client device;
   wherein the wired host device is mapped to the set of WAPs such that the wired host device is discoverable by the client device based on a location of the client device.

2. The method of claim 1, wherein the service advertisement message includes a first multicast packet encapsulated within a second multicast packet.

3. The method of claim 2, further comprising identifying the wired host.

4. The method of claim 2, wherein the second multicast packet has a header including a MAC address of the switch as a source MAC address.

5. The method of claim 1, further comprising:
   periodically obtaining neighbor information for the switch from a management server; and
   determining the set of WAPs connected to the switch based on the neighbor information.

6. The method of claim 1, wherein the service advertisement message is received as a multicast Domain Name Server (mDNS) packet from the switch.

7. The method of claim 1, wherein the service advertisement message is received from a WAP from the set via a multicast aggregation tunnel connecting the WAP with the controller.

8. A method comprising:
   receiving, by a switch, a service advertisement message comprising information of a service hosted by a wired host device in a network;

adding, by the switch, a header information to the service advertisement message, the header information comprising a Media Access Control (MAC) address of the switch as a source MAC address of the service advertisement message; and sending, by the switch, a multicast transmission of the service advertisement message to each of a plurality of ports of the switch;

wherein the header information of the service advertisement is used to map the wired host device to a set of Wireless Access Points (WAPs) connected to the switch such that the wired host device is discoverable by a client device connected to one of the set of WAPs based on a location of the client device.

9. The method of claim 8, wherein the header information is added, in response to determining that the source MAC address of the service advertisement message is not associated with one of a list of switches in the network.

10. The method of claim 8 further comprising:
periodically obtaining neighbor information for the switch from a management server; and
creating a list of switches in the network based on the neighbor information.

11. A non-transitory computer-readable medium comprising computer-readable instructions, the computer-readable instructions when executed by a processor, cause a controller to:
receive a service advertisement message comprising information of a service hosted by a wired host device in a network;
determine based on a header information of the service advertisement message, that the service advertisement message is from a switch;
map the wired host device to a set of Wireless Access Points (WAPs) connected to the switch; and
send identification information of the wired host device to a client device connected to one of the set of WAPs, in response to receiving a query for the service from the client device;
wherein the wired host device is mapped to the set of WAPs such that the wired host device is discoverable by the client device based on a location of the client device.

12. The non-transitory computer-readable medium of claim 11, wherein the service advertisement message includes a first multicast packet encapsulated within a second multicast packet.

13. The non-transitory computer-readable medium of claim 12, further comprising computer-readable instructions to:
remove a header of the second multicast packet to obtain a header of the first multicast packet; and
determining a MAC address of the wired host device from the header of the first multicast packet.

14. The non-transitory computer-readable medium of claim 12, wherein the second multicast packet has a header including a MAC address of the switch as a source MAC address.

15. The non-transitory computer-readable medium of claim 11, further comprising computer-readable instructions to:
periodically obtain neighbor information for the switch from a management server; and
determine the set of WAPs connected to the switch based on the neighbor information.

16. The non-transitory computer-readable medium of claim 11, wherein the service advertisement message is received as a multicast Domain Name Server (mDNS) packet from the switch.

17. The non-transitory computer-readable medium of claim 11, wherein the service advertisement message is received from a WAP from the set via a multicast aggregation tunnel connecting the WAP with the controller.

18. The non-transitory computer-readable medium of claim 11, wherein the switch is connected to the controller over a layer 2 network.

19. The method of claim 3, wherein identifying the wired host comprises:
removing a header of the second multicast packet to obtain a header of the first multicast packet; and
determining a MAC address of the wired host device from the header of the first multicast packet.

20. The method of claim 1, wherein the switch is connected to the controller over a layer 2 network.

* * * * *